Sept. 28, 1948. R. L. WEST 2,450,261
TRAINING EQUIPMENT FOR AVIATORS
Filed May 29, 1942 5 Sheets-Sheet 4
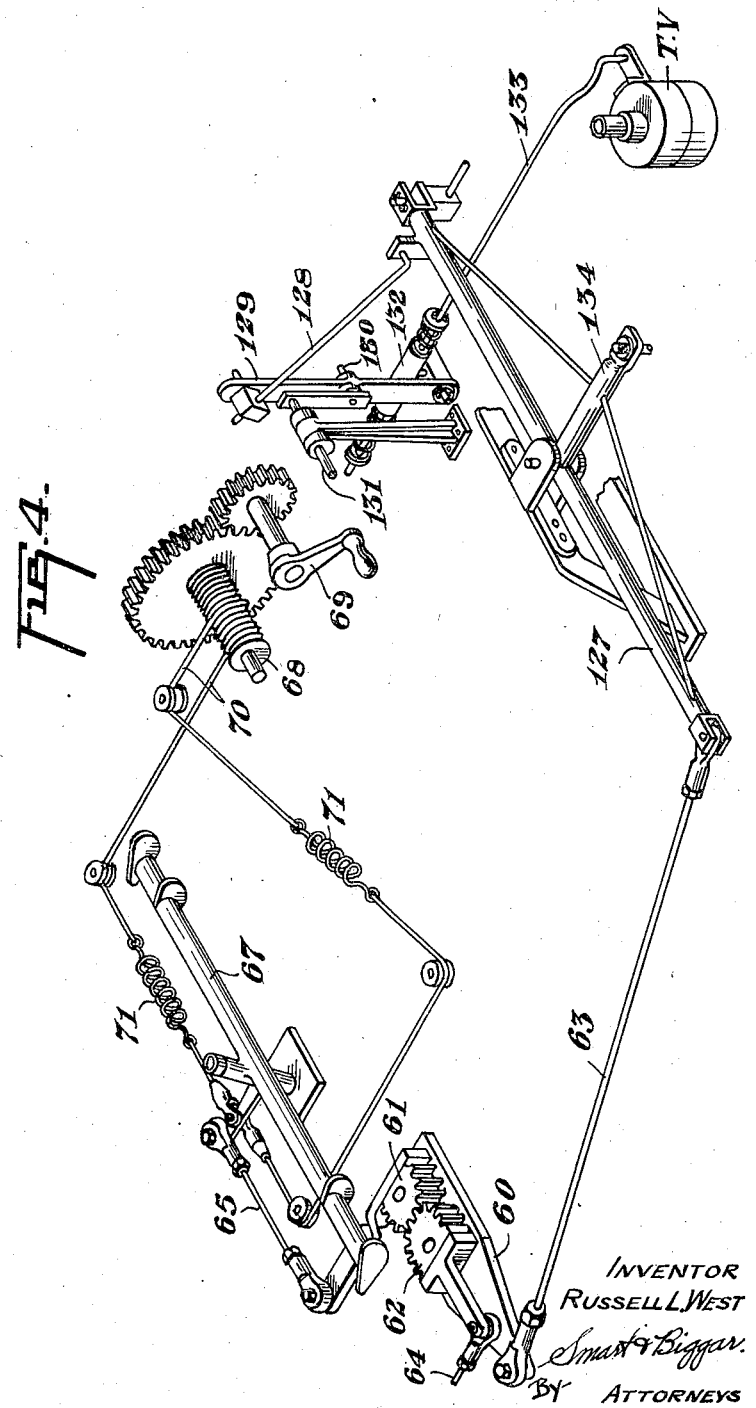

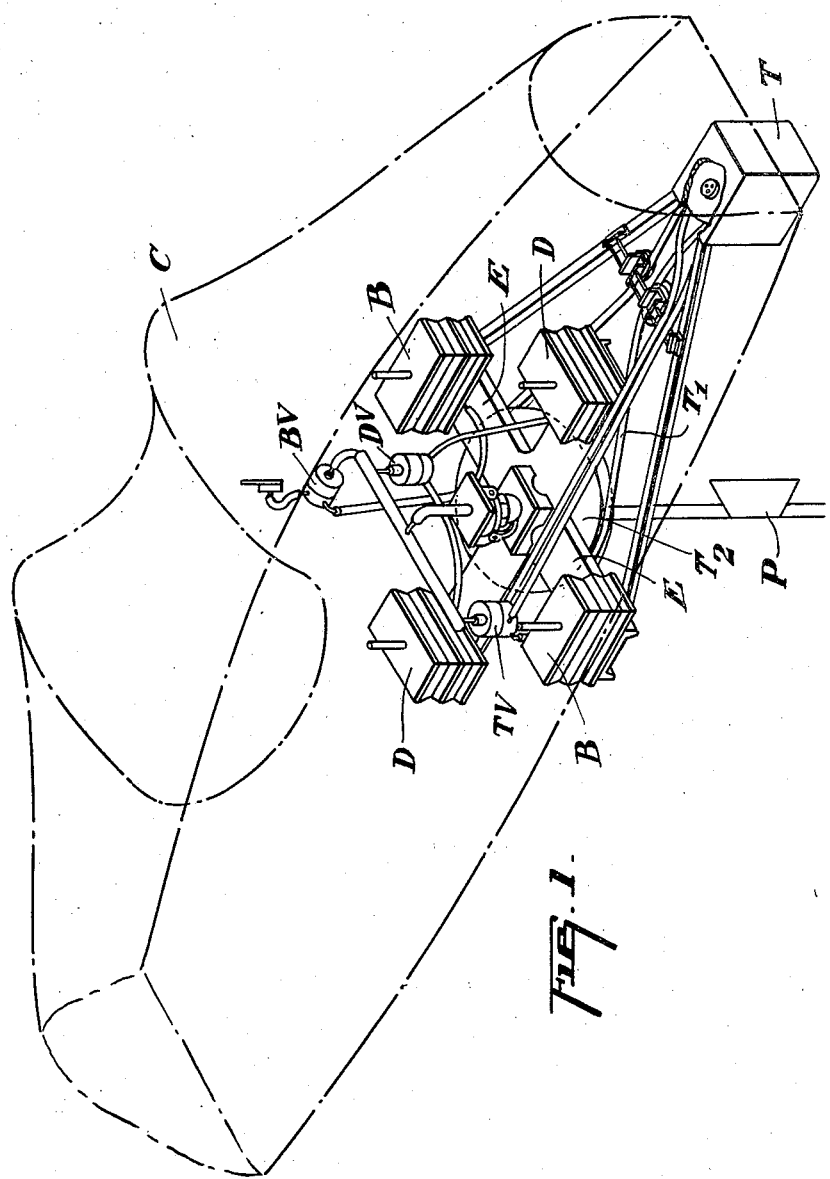

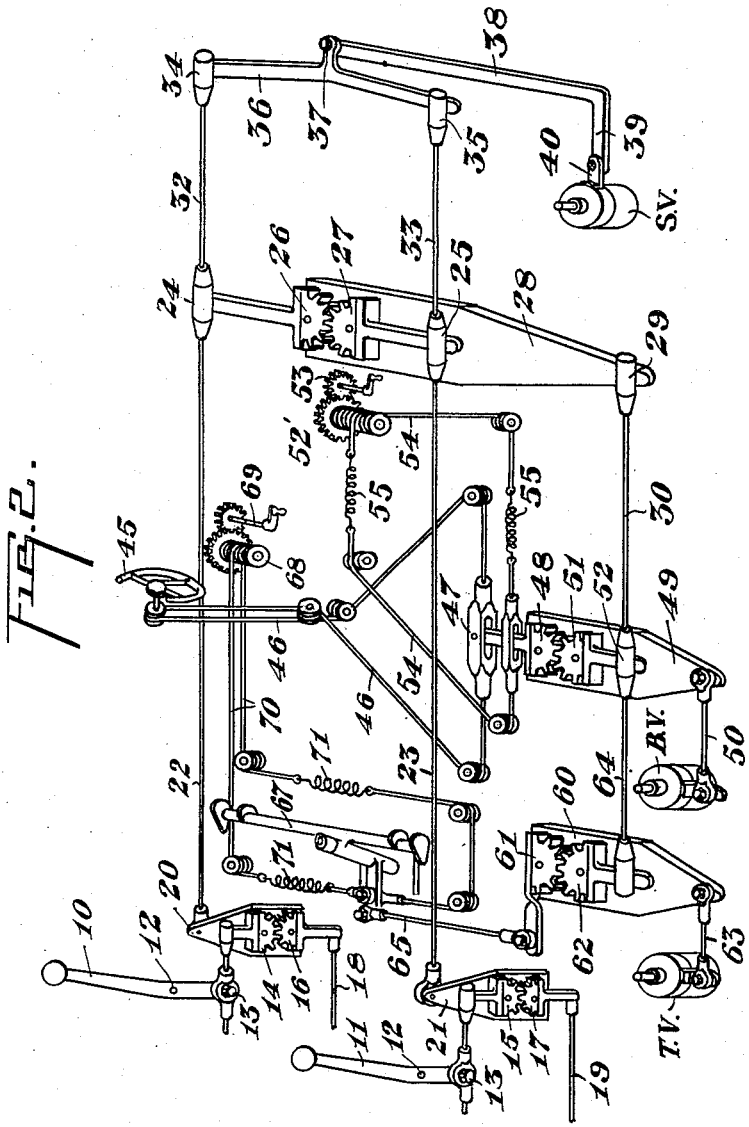

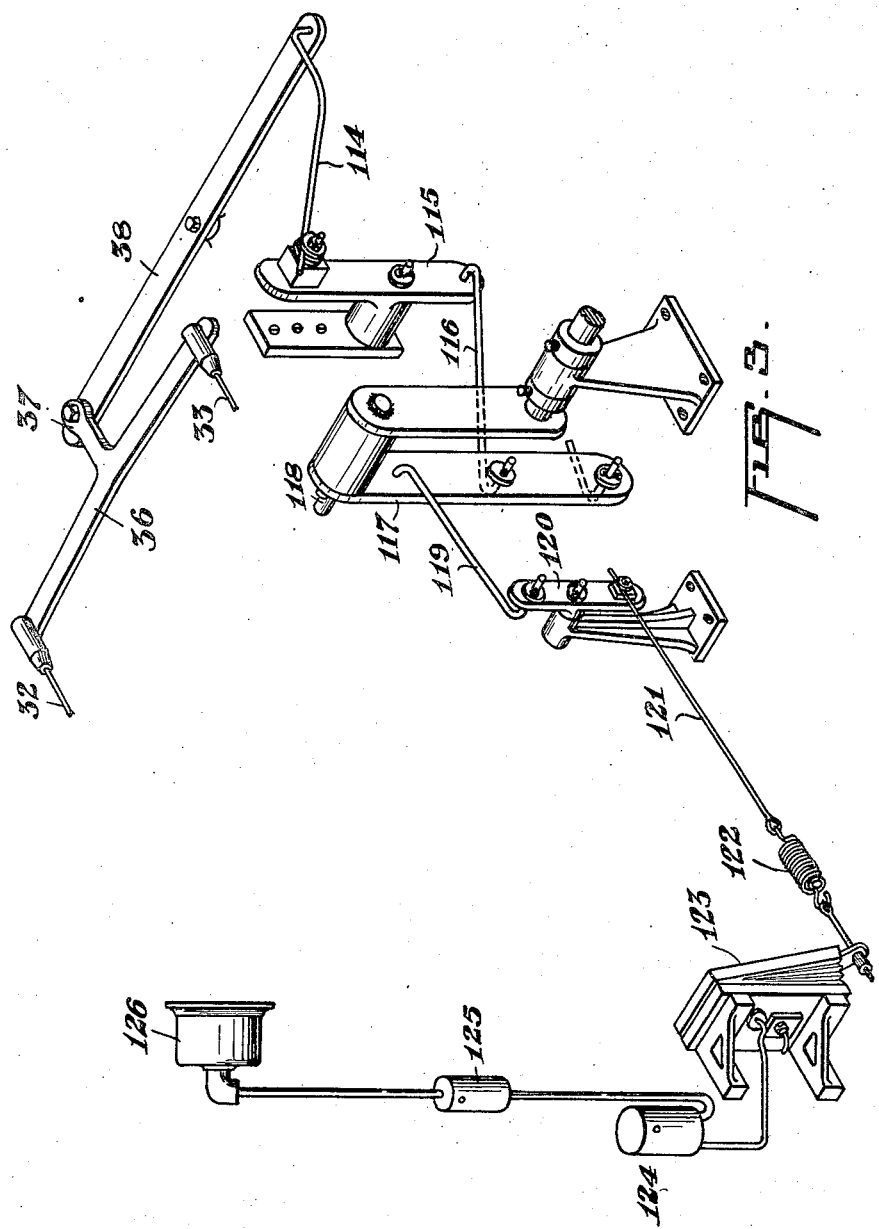

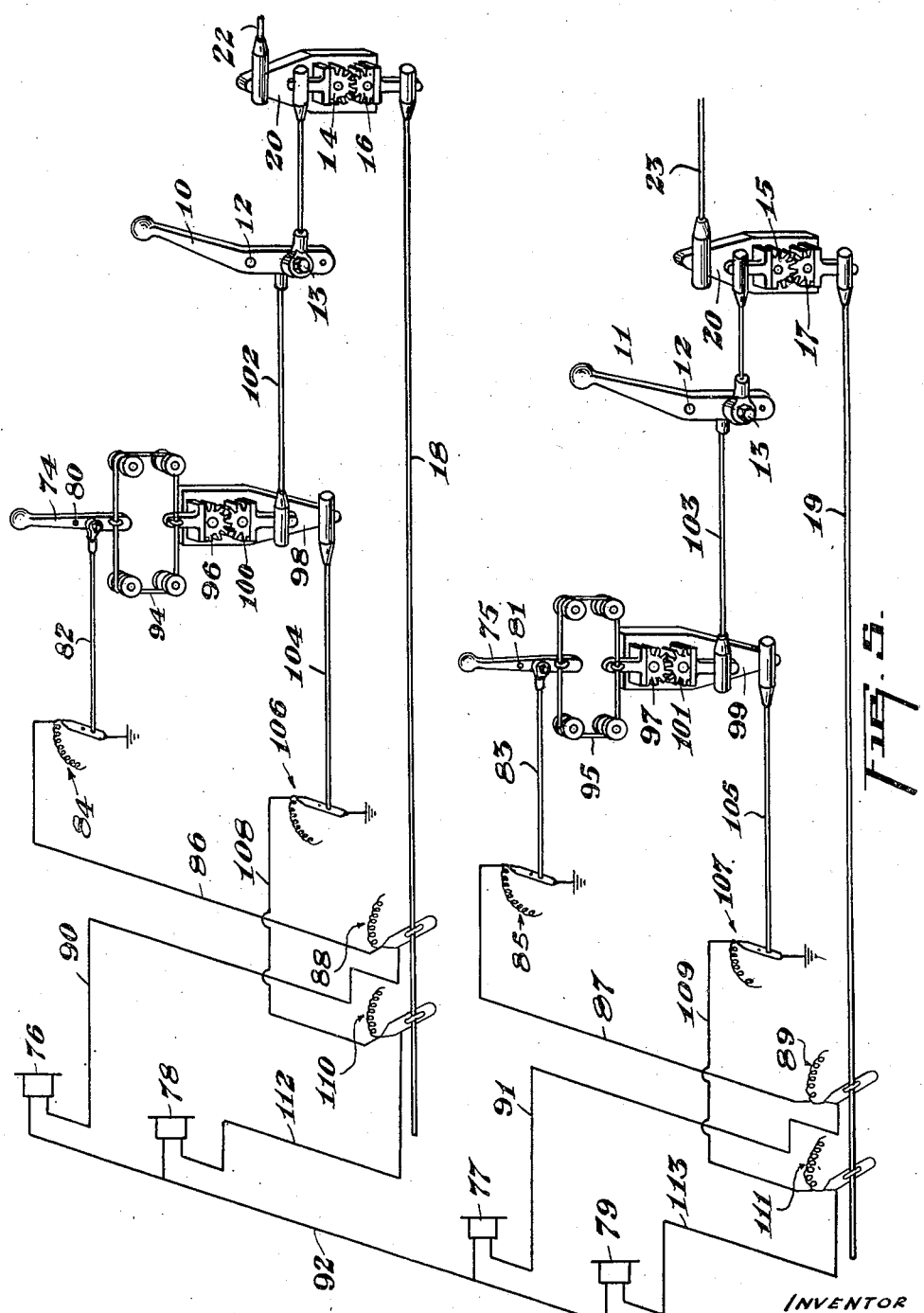

Patented Sept. 28, 1948

2,450,261

UNITED STATES PATENT OFFICE 2,450,261

TRAINING EQUIPMENT FOR AVIATORS

Russell L. West, Montreal, Quebec, Canada, assignor, by mesne assignments, to Link Aviation, Inc., Binghamton, N. Y., a corporation of New York Application May 29, 1942, Serial No. 445,060
In Canada February 11, 1942

10 Claims. (Cl. 35—12)

This invention relates to training equipment for aviators and is particularly concerned with such equipment which includes a training cockpit equipped with a pilot's seat and replicas of control mechanism and indicating instruments. In such devices now in use the training cockpit will turn and tilt and the indicating instruments will respond in answer to movements of the controls in true simulation of actual aeroplane operation. In addition such devices are usually associated with a remotely positioned instructor's desk where duplicates of the instruments are located, and, if desired, radio simulating communication between an instructor at the desk and the student in the training cockpit may be maintained.

Knowledge of the construction and operation of such devices is common to those skilled in the art to which the invention relates and since full detailed disclosures of such devices are available in prior patents and applications, structural features not concerned with the present invention are here omitted. Suffice it, therefore, to point out that in such devices movements of the control devices cause corresponding movements of pneumatic valves, the adjustments of which cause a reflected change in the position of the cockpit and in the readings of the instruments both in the cockpit and on the instructor's desk.

While these trainers have been invaluable as an aid to pilot training and refreshing, particularly in connection with our present war effort, they provide no means for instructing the pilot in the proper handling of the motor controls of multi-motor planes and particularly in the proper manipulations required to overcome the effect on a multi-motor plane of one motor functioning in a slower or less efficient manner than another or of one motor ceasing to function entirely. In flying, the effect of such differences in the motor action of a multi-motor plane is that, should the port motor cease to function, the air speed over the port wing will decrease and the lifting power of that wing will fall below the normally balanced lifting power of the starboard wing, causing the plane to tilt to the port side. Likewise, the driving force of the port motor will be reduced or cease entirely and the lack of balance between driving forces will thus cause the starboard motor to drive in advance of the port motor, causing a turning movement of the plane to the port side. In actual flying such movements may be compensated for by a skilled pilot through applying the opposite rudder and moving the stick to adjust his ailerons to an opposite banking position. The controls may thus be used to hold the plane on its desired course and on an even keel for almost indefinite periods of time.

Another difficulty with present trainers is that they do not provide for familiarizing or refreshing the pilot in the motor controls of constant speed variable pitch propellers. A growing majority of planes today, both single and multiple motor, are provided with constant speed variable pitch propellers. For each of such motors provided with propellers there is provided in the cockpit a pitch control arm and mixture control setter in addition to the throttle lever. While such controls may take a similar physical form, usually being a pivoted lever, the distinguishing terms lever, arm and setter are used for the throttle, pitch control and mixture control for convenience. While with a variable speed motor with fixed pitch propeller, proper motor control may be had by control of the throttle lever only, with a possible but infrequent adjustment of the mixture setter, such is not the case with a constant speed motor with variable pitch propeller. With the latter devices a pitch control arm readily manipulatable by the pilot is essential. Setting of this arm does not in fact directly set the pitch of the propeller blades. It does, however, set a governor which for normal operating conditions holds the motor to a constant speed. When it is desired to increase the air speed of the plane in level flight the throttle control lever is adjusted to increase the engine power and in consequence the propeller pitch will increase to absorb the additional power in accordance with the new setting of the throttle. If power is in excess of the rated limits of the engine at a given R. P. M. the pitch control arm should be adjusted to increase the pitch to conform with the power applied. It will of course be obvious that the adjustments of the simple single throttle lever of the prior type of device will not familiarize the pilot with operations of ships equipped with constant speed variable pitch propellers here referred to.

The general objects of the invention are, thus, to provide in a device of the character set forth, means for training students in the handling of multi-motor aeroplanes and in the motor controls of aeroplanes equipped with constant speed variable pitch propellers.

One of the specific objects of the invention is to provide for a movement of the cockpit and an indication by the instruments in simulation of the reaction of a multi-motored plane to differences in operation between the motors, as for instance when one motor fails to function properly or "cuts out."

A further specific object is to provide, in a device as set forth, means controllable by the instructor to initiate reactions in simulation of a motor of a multi-motored plane "going dead" and to provide means controllable by the student to compensate for such reactions.

Another object is to provide means in simulation of a trimmer in an aeroplane whereby the student having compensated for the reaction of the device in simulation of one of his motors going dead may trim his controls to retain them in their newly adjusted position without continuous physical strain.

Numerous other general and specific objects and features of the invention will become apparent from a consideration of the following specification and the accompanying drawings. It will, of course, be understood that the invention is not concerned with the specific means for imparting movements to the training cockpit in response to the setting of the "turn" or "bank" valves, nor is the invention specifically limited to the structural details here shown by way of illustration. The structure and arrangement of parts here shown as illustrative of one form of the invention are designed for inclusion in one present day commercially successful type of trainer which utilizes a vacuum system for controlling most of the interrelated parts. Obviously it is within the skill of those familiar with the art to provide alternate or equivalent structures for applying the invention to various other types of trainers and to design the equipment to conform with various changes and modifications of such devices.

In general terms the invention provides for the mounting in a training cockpit of a plurality of sets of motor control levers comprising throttle lever, pitch arm and mixture setter in simulation of such controls as are present in the cockpit of multi-motored planes. The pitch arms are directly connected to control the setting of tachometers while the throttle lever and pitch arm jointly control a boost gauge. Duplicates of such gauges are mounted on the instructor's desk. Movements of the throttle levers are transmitted to the valve controlling the "air speed" indicator through the medium of a linkage system such that the movement of one lever alone (assuming simulation of a bi-motored plane) will impart an adjustment to that valve of only half the degree that would be imparted were both levers simultaneously moved a like distance. The levers are also connected through a differential device so as to provide for the movement of an associated linkage system when the levers are moved with respect to each other. The associated linkage system is connected with both the turning valve and the bank valve and in each instance the connection is by way of differential devices involving the manual controls for these valves. The arrangement is such that should one throttle lever alone be moved, the air speed valve will be proportionately adjusted and the "turn" valve and the "bank" valve will be moved by the linkage system to turn and bank the cockpit in simulation of the reaction of a multi-motored plane to a difference in motor operation. The connection of the linkage system through the differential devices, however, provides means for compensation for such movements by the linkage system so that the pilot may adjust his controls to conform to the new setting of the linkage system. Means are provided under the control of the instructor for similarly affecting the "air speed," "turn" and "bank" valves independently of the position of the throttle levers. Thus the instructor may impose, at will, a reaction similar to the accidental cutting out of one of the motors. Means are also provided for trimming the plane by setting the rudder and aileron controls after adjustment compensating for the reactions caused by such movement of the valves. Means are also provided for visually indicating to the instructor the position or movement of other motor control simulating devices such as the carburetor mixture setting, this being preferably accomplished through electrical circuits controlled by the position of the mixture setter.

In the drawings:

Figure 1 is a general view indicating the trainer cockpit and the instrumentalities and controls for imparting bodily movement thereto.

Figure 2 is a detailed diagrammatic view of the control system of the present invention.

Figure 3 is a detailed view of the throttle control.

Figure 4 is a detailed view of the recorder control, and

Figure 5 is a diagrammatic view of an arrangement for simulating the controls of an aircraft having constant speed motors and variable pitch propellers.

Referring more particularly to Figure 1, the letter C indicates the cockpit shown in the dot dash lines. The cockpit is mounted through a universal joint (not shown) for pivotal movement, and is laterally supported by banking bellows B and longitudinally supported by climb and dive bellows D. Control of the pressure within the banking bellows B is maintained by the bank valve BV, while similar control of the climb and dive bellows is maintained by valve DV. The bellows B and D are mounted on cross arms E of a rotary table which supports the cockpit C, the rotation of which is controlled by turn-motor T, through a cable T₁ running around a pulley T₂, the motor being controlled by the turn-valve TV. A suitable motor-driven vacuum turbine P (diagrammatically shown) is provided to maintain a vacuum throughout the system and through the control valves BV, DV and TV, provide for the banking, climbing and diving, and turning of the cockpit.

The structure illustrated in Figure 1 forms no part of the present invention, and is an illustration of the familiar Link type of trainer previously patented (see, for example, U. S. Patent 2,099,869) and now in general use. The present invention is concerned with the control means of the trainer and particularly the control for the bank valve BV and turn valve TV, the disclosure of Figure 1 being given here to provide a complete disclosure of an operating mechanism to which the control of the present invention is applicable.

Referring more particularly to Figure 2, the numerals 10 and 11 indicate levers, simulating throttle control levers for the control of starboard and port motors respectively. The throttle levers are pivoted at 12, and connected at their lower ends at 13 with starboard and port throttle quadrants 14 and 15 which constitute the upper sectors of port and starboard throttle differentials. The throttle sectors 14 and 15 are semi-circular gears the teeth of which mesh with companion teeth in port and starboard instructor sectors 16 and 17, which are adapted to be actuated by port and starboard actuating devices 18 and 19 which, as hereinafter described, are adapted to be remotely controlled by the instructor.

The sectors 14 and 16 and the quadrants 15 and 17 are pivotally mounted upon port and starboard throttle differential arms 20 and 21 respectively, which in turn are pivotally mounted at points equidistant from the centres of the pivotal mountings of sectors 14 and 16 and 15 and 17 respectively.

The specific type of differential here shown is used throughout the present control arrangement and provides for both differentials action and a lost motion connection. It will be seen that when one of the sectors remains stationary while the other is pivotally moved, the one pivotally moved will by enmeshment with the teeth of the companion sector move with planetary motion about the pivot point of the master arm as the centre. Thus, should the handle of the throttle lever 10 be moved backwards to cause clockwise pivotal movement of the lever around its pivot 12, the connection 13 will move forwardly rocking the arm of the sector 14 in a counter-clockwise direction on its own pivot, and with the sector 16 stationary such movement will cause counter-clockwise planetary motion of the centre of the sector 14. Since the sector 14 is pivoted at its centre upon the throttle differential arm 20, which in turn is pivoted to a fixed base intermediate the centres of the sectors 14 and 16, the arm 20 will be rocked on its centre in counter-clockwise direction. Similarly should the throttle lever be retained stationary, and with it the throttle sector 14, while the arm of the instructor sector 16 is rocked in clockwise direction, the throttle differential arm 20 will be moved in clockwise direction around its pivotal point. It will also be noted in considering the actions of this type of differential that should the sectors 14 and 16 be equally moved in opposite directions there will be no responsive movement of the arm 20, and likewise should the sector 14 be rocked to impart a predetermined motion to the arm 20 an equal and opposite rocking of the sector 16 will return the arm 20 to its original position. While in the normal operation of the present invention the throttle sector will not be used to offset or compensate motion imparted to the arm 20 by rocking of the instructor sector 16, this action of the differential is here referred to since in other places in the structure such compensating action will be the normal mode of operation of similar differentials.

The throttle differential arms 20 and 21 are connected with starboard and port master links 22 and 23, which are connected as at 24 and 25 respectively to the arms of port and starboard master sectors 26 and 27, which in turn are pivotally mounted upon a master differential arm 28, the outer end of which is connected as at 29 to what may be referred to as a cut-out link 30.

Rearwardly of the connections 24 and 25 are starboard and port extensions 32 and 33 of the links 22 and 23 connected as at 34 and 35 respectively, with an air speed yoke 36. The centre of the yoke 36 is pivotally connected as at 37 to the arm 38 of a bell crank lever, the angularly disposed arm 39 of which is connected to the actuator 40 of an air speed valve SV. From a study of the mechanics of this arrangement it will be seen that should the arms 32 and 33 be equally moved the yoke 36 will move bodily rocking the bell crank with its arms 38 and 39 and changing the adjustment of the speed valve through movement of its actuator 40. On the other hand, should one of the links 32 or 33 be moved while the other link remains stationary, the yoke 36 will pivot about its connection with the stationary link, and the movement of the arm 38 of the bell crank will be but a fraction of the amount of movement which would be imparted thereto had the other link been actually moved.

With this arrangement in mind it will be seen that should the instructor energize the actuating device 18 to rock the instructor sector in counter-clockwise direction while the throttle remains stationary, the throttle differential arm 20 will likewise rock in counter-clockwise direction, the link 22 will move forward and the yoke 36 will pivot about its connection 35 rocking the bell crank arm 38 in counter-clockwise direction and reducing the setting of the speed valve SV. The same effect on the linkage system may be had should the instructor sector 16 remain stationary while the handle of the throttle lever 10 is moved rearwardly in simulation of cutting out or reducing the speed of one of the motors of a multi-motored plane. It will, of course, also be obvious that the throttle lever 11 and its associated links and connections indicated by the odd numbered numerals of the port side of the system will have like effect on the control of the speed valve, and should both throttle levers be moved together the setting of the speed valve will be altered to a proportionately greater degree. With regard to the speed valve it will be understood that this valve is adapted to control the readings of an air speed indicator mounted upon the cowl of the cockpit, while a similar companion instrument is provided at the instructor's desk. The speed valve SV may also control the speed of movement of the charting device at the instructor's table. It will be noted that should one of the actuating devices be energized to simulate the cutting out of one of the motors, its associated linkage system, including the yoke 36, will be actuated without movement of the throttle lever, so that the pilot will be required to familiarize himself with the effect on the plane and the reading of the instruments such as the air speed indicator to advise him of the cutting out of one motor of a multi-motored plane.

Control of the bank valve BV, which in turn controls the energization of the bellows B, is provided for through a handwheel 45 which operates cable 46, which connects as at 47 to the arm of a wheel sector 48, which is mounted upon the master arm 49 of the bank valve differential, which through a suitable link 50 directly engages the actuator of the bank valve BV. The companion sector 51 of the bank valve differential is engaged as at 52 with the cutout link 30. It will thus be seen that with the throttle levers in fixed position, and without actuation of the actuating devices 18 and 19, the link 30 will remain stationary, and movement of wheel 45 will rock the sector 48 to move it with clockwise or counter-clockwise planetary motion, thus imparting similar rocking motion to the master arm 49, and adjusting the bank valve accordingly. In like manner should the wheel be held stationary while one or the other of the throttle levers or actuators moves the port or starboard linkage system, the master differential arm 28 will be moved, imparting like movement to the link 30 and rocking the sector 51, which will cause a corresponding movement of the master arm 49, thus adjusting the setting of the bank valve BV. By this arrangement it will be seen that should the instructor actuate one of the actuating devices, for instance 18, thus causing a counter-clockwise planetary motion of the sector 26 and similar pivotal movement of the master differential arm, the bank valve will be moved to energize the bellows B applying a turning tilting action to the cockpit, which will be in simulation of the similar banking action in a multi-motored plane when one motor ceases to function. Such banking moment applied to the cockpit through actuation of the master differential arm may, however, be overcome by the pilot's manipulation of the wheel 45. Thus by applying opposite bank the banking moment may be overcome and the simulated flight of plane straightened out, since it is obvious that the opposite rocking of sector 48 will restore the arm 49 to its normal zero position.

Since in actual flight should one motor go dead it is necessary to maintain the opposite bank setting for long periods of time, planes are provided with so-called trimming devices which may be set to hold the control at the desired setting without requiring continual strain by the pilot. Such device is simulated by the reel 52' which may be turned by the crank driven gear 53 and over which passes a cable 54, this cable having in it springs 55 on opposite sides of its connection to the arm of the sector 48. Thus when bank is normally applied one of the springs 55 is expanded while pressure is relieved upon the opposite one. However, should it be desired to retain this position the crank 53 may be actuated to move the cable system over its pulleys, again balancing the tension on the springs so that the system will normally maintain the position of the new setting.

A similar control for the turn valve TV is provided through a turn valve differential including a master arm 60, a rudder quadrant 61 and companion sector 62. The master arm 60 is connected through a link 63 to the operating arm of the turn valve TV. The companion sector 62 is operated by direct connection of a link 64 with the cutout link 30 and the companion sector 51 of the bank valve differential. The rudder sector 61 is engaged by rudder link 65 directly engaging a rudder arm secured to the centre of the foot control rudder bar 67. A rudder trimmer simulating device is provided by the reel 68, crank 69, cable 70 and springs 71, the operation of the device being similar to that of the trimmer simulating mechanism for the banking control including the reel, crank, cable and springs 53, 54, 46 and 55. From a consideration of this device it will be seen that the control of the turn valve TV in response to movement of the rudder bar is exactly similar to the control of the bank valve BV in response to movements of the wheel 45 and that likewise the turn valve will be operated with the bank valve upon movement of the cutout link 30 in response to movement of the master differential arm when either of the master links 22 or 23 is moved with respect to the other in response to actuation either of one of the throttle valves or of one of the actuating devices 18 and 19.

Thus it will be seen that upon operation of one of the actuating devices or relative movement between the throttle levers the turn and bank valves will be actuated to apply a turning moment and a banking movement to the cockpit in simulation of the response of a multi-motored plane when one motor cuts out. Such turning moment and banking movement may be overcome by proper manipulation of the wheel and rudder bar, and thus the pilot may receive instruction and gain practice in the manipulation of multi-motored planes without endangering his own life or running the risk of damaging expensive planes of multi-motored type.

Multi-motored planes, in addition to having a plurality of throttles, are commonly provided with so-called constant speed motors using variable pitch propellers. As pointed out hereinbefore, the motor speed is controlled by the setting of the blade pitch control arm, one being provided for each motor. By the adjustment of this arm the governor within the variable pitch propeller hub is set to govern the speed of the motor by causing an increase or decrease in the pitch of the blade when the motor increases or decreases in speed, thus increasing or decreasing the load on the motor, thereby maintaining the motor speed constant for a given setting of the governor.

The present invention provides for a simulation of the constant speed motor variable pitch blade assembly by providing starboard and port pitch control arms 74 and 75 (see Figure 5), which directly control the readings of starboard and port tachometers 76 and 77, and by providing boost gauges 78 and 79 the readings of which are controlled jointly by the settings of the throttle levers and pitch control arms. In this arrangement the tachometers and boost gauges are electrically operated but vacuum operation could be substituted though this would involve more complicated arrangement with no corresponding advantages in this case where the instrument readings, at least under cruising conditions, depend only on the arm and lever settings. The throttle control levers 10 and 11 and other associated master arms 20 and 21 shown in Figure 1 have been shown also in Figure 5 to make clear the relationship between the arrangements of the two figures.

Referring to Figure 5, the pitch control arm 74 is pivoted at 80 and is attached to a link 82 connected at its opposite end to the arm of a rheostat 84, which is in a circuit including the wire 86, rheostat 88 (the function of which will be discussed below), wire 90, tachometer 76 and wire 92 connected to an appropriate source of electric power. The arm 75 is similarly pivoted at 81 and attached through link 83 to rheostat 85 which is connected to the source of power through wire 87, rheostat 89, wire 91, tachometer 77 and the common wire 92.

Besides being attached to the link 82, the arm 74 is attached to a cable 94 to which is connected the arm of a sector 96 mounted on a differential arm 98 and meshing with another sector 100, which is connected to the throttle lever 10 through a link 102. The master arm 98 is connected by a link 104 to the arm of a rheostat 106, which is in a circuit including the wire 108, rheostat 110 matching rheostat 88, wire 112, boost gauge 78 and common wire 92. The arm 75 has exactly similar connections bearing the corresponding odd numbers to the even numbers just mentioned. Thus, the cable for the arm 75 is 95, the sector to the arm of which that cable is connected is 97, and so on as shown in the drawing.

The arms of the rheostats 88 and 110 referred to above are connected to the actuating device 18, so that upon movement of such device under control of the instructor the arms will be moved over the resistances of the rheostats. The arms of rheostats 89 and 111 are similarly connected to the actuating device 19.

The position of the levers 10 and 11, as shown in Figure 5, corresponds to fully open throttle and that of the arms 74 and 75 to the lowest propeller pitch. In actual flying operations at anything but abnormally low speeds, with the simulation of which the arrangement of Figure 5 is not concerned, the speed of the engine and thus the reading of the tachometer will decrease as the propeller pitch is increased. Similarly, the intake manifold pressure and consequently the boost gauge reading will decrease as either the propeller pitch is increased or the opening of the throttle is decreased. These effects are simulated by the arrangement of Figure 5. When the handle of, for instance, the arm 74 is moved to the right in the figure, the link 82 will move to the left and move the arm of the rheostat 84 over the latter's resistance, thus increasing the resistance in the circuit including the tachometer 75 and decreasing the reading of the latter. Moreover, this movement of the handle of arm 74 will cause clockwise planetary movement of sector 96 about quadrant 100 and consequent clockwise movement of the differential arm 98, with the result that the arm of rheostat 106 is moved over its resistance and the reading of boost gauge 78 in the circuit of that rheostat is decreased. This effect is obtained also by moving the handle of the throttle lever 10 to the right in the drawing because this movement causes clockwise movement of the sector 100 and thus of the differential arm 98. Accordingly, it will be seen that the reading of the tachometer 76 is governed by the setting of the pitch control arm 74 and that of the boost gauge 78 is governed jointly by the settings of the arm 74 and the throttle lever 10.

The rheostats 88 and 110 and 89 and 111, referred to above, are for the purpose of causing appropriate alterations in the reading of tachometer 76 and boost gauge 78 and tachometer 77 and boost gauge 79 respectively when the instructor operates one of the devices 18 or 19 to simulate failure of a motor. It will be noted that the arms of, for example, the rheostats 88 and 110 are so mounted that, when the device 18 is moved to the right in the drawing (as it will be to simulate failure of the motor), they will move over the resistance of the respective rheostats to increase the resistance in the circuits of the tachometer and boost gauges and decrease the readings of these instruments. Ordinary cut-out switches could be used instead of the rheostats 88 etc., but the latter have been shown as simulating somewhat better the effect on the instrument readings of a dying motor.

Figure 3 shows a specific form of attachment of the yoke 36, referred to in connection with Figure 2, to the valve controlling the air speed indicator in a "Link" trainer. As shown in Figure 3, the links 32 and 33 running from the master arms of the throttle and actuator differentials connect as at 34 and 35 to the yoke 36, which is pivotally connected as at 37 with a rocker arm 38, which takes the place of the bell crank arm 38a of Figure 2. An adjustable link 114 connects the opposite end of the arm 38 with an adjustably pivoted arm 115. A link connection 116 connects the arm 115 with a second arm 117, the fulcrum 118 of which is rotatable under the influence of the mechanism of the present Link trainer, it being understood that the structure here illustrated forms no part of the present invention and is illustrated here only by way of showing a preferred means of structurally applying the present invention to a present-day type of trainer.

The arm 117 is connected to a second set of linkages including link 119, pivoted arm 120 and link 121. Link 121 is connected by a spring 122, which in turn is directly connected to a bellows 123. The bellows controls a needle valve which controls pressure leading through the devices 124 and 125 to the air speed indicator 126. The linkage system of the trainer as here depicted provides for variation in the air speed indicator through climb and dive mechanism so that the direct reading of the air pressure gauge is not wholly in response to the setting of the throttle; and thus the present invention may be applied to the trainer without interfering with the responsiveness of the instrument to other associated mechanisms which normally have their effect on the reading of the instrument.

Similarly Figure 4 depicts a preferred means of connecting the rudder mechanism to the turn valve T.V. The rudder bar 67 is connected through links as shown in Figure 2 to the sector 61, which meshes with the quadrant 62 operated by the link 64. In actual practice instead of directly running to the turn valve, the link 63 from the master arm 60 of the differential leads to a yoke 127, the opposite end of which is connected by a link 128 to a pivoted arm 129, the pivotal point 130 of which is movable under the influence of other associated mechanism as by rotation of the shaft 131. The lower end of the arm 129 is connected by a spring coupling device 132 to a link 133 which directly actuates the turn valve. In this instance, as in the illustration of Figure 3, it will be understood that the structural parts shown are structural parts now employed in the Link trainer, the linkage system providing for an automatic turning movement in response to banking and providing for simulation of bumpy or adverse weather conditions. The yoke 127 has an extension 134 controlling a tail spin mechanism, which also has its effect upon the turn valve. As in connection with the illustration of Figure 3, it will be understood that the structural parts here shown form no part of the present invention and are presented only by way of illustrating the method of directly attaching a preferred structure of applicant's device to the present-day type of Link trainer now in operation.

What I claim is:

1. An aircraft pilot trainer comprising means for simulating a plane having a motor and variable pitch propeller combination of the type in which the motor speed tends to remain constant while variations in load are compensated for by adjustment of the pitch of the propeller blades, said means including a pair of controls simulating the pitch control arm and throttle lever of a plane, a pair of gauges in the form of a simulated tachometer and simulated manifold pressure gauge adapted to record the setting of the arm and lever, one of the gauges responding only to movement of the arm simulating control and the other gauge responding to movement of either the arm simulating control or the lever simulating control or to the combined movement of both.

2. An aircraft pilot trainer according to claim 1 comprising additional means for affecting the reading of the gauges independently of the setting of the arm and lever.

3. An aircraft pilot trainer according to claim 1 comprising an air speed gauge and means for actuating said gauge means upon movement of the throttle lever.

4. An aircraft pilot trainer comprising a cockpit, mechanisms operable to cause the cockpit to turn and bank, manual controls in the cockpit for operating said turn and bank mechanism respectively under control of the student, a pair of actuating devices operable from outside the cockpit, and connections from said devices to said turn and bank mechanisms operable upon operation of one actuating device without the other to actuate said turn and bank mechanisms to cause the cockpit to turn and bank in a direction dependent upon the device operated in simulation of the action of a multi-motored aeroplane having at least one motor out of operation.

5. An aircraft pilot trainer comprising a cockpit, mechanisms operable to cause the cockpit to turn and bank, manual controls in the cockpit for operating said turn and bank mechanism respectively under control of the student, a pair of actuating devices operable from outside the cockpit, a pair of levers in the cockpit simulating the throttle levers of a multi-motored aeroplane, and connections from said devices and levers to said turn and bank mechanisms operable upon operation of one device or one lever without the other to actuate said turn and bank mechanisms to cause the cockpit to turn and bank in a direction dependent upon the device or lever operated in simulation of the action of a multi-motored aeroplane having at least one motor out of operation.

6. An aircraft pilot trainer according to claim 5, in which operation of the actuating devices is independent of movement of the levers.

7. An aircraft pilot trainer according to claim 4, comprising an air speed indicator, means for controlling the indications given by said indicator, and connections between the actuating devices and said controlling means to actuate said controlling means upon operation of one device without the other to only half the extent that said means are actuated upon operation of both devices.

8. An aircraft pilot trainer according to claim 5, comprising an arm, a pair of meshing sectors pivoted on said arm, a connection from each of said sectors to a throttle simulating lever and an actuating device, a pivotal mounting for the arm midway between the pivot points of the sectors, and a connection from one end of the arm to the turning and banking mechanisms.

9. In a grounded aviation trainer comprising a fuselage having a place for a student, means for simulating the function of the manifold pressure gauge and tachometer in a real plane equipped with a constant speed propeller, said means comprising a simulated throttle control and a simulated propeller governor control, a simulated manifold pressure gauge for indicating the assumed manifold pressure of an engine assumed to be associated with said gauge and a simulated tachometer for indicating the assumed speed of said assumed engine, means for causing said gauge to register in accordance with the setting of said throttle control and in accordance with the setting of said governor control, and means for causing said tachometer to register in accordance with the setting of said governor control.

10. In a grounded aviation trainer comprising a fuselage having a place for a student, means for simulating the functioning of the manifold pressure gauge and tachometer in a real plane equipped with a constant speed propeller, said means comprising a simulated throttle control and a simulated propeller governor control, a simulated manifold pressure gauge for indicating the assumed manifold pressure of an engine assumed to be associated with said gauge and a simulated tachometer for indicating the assumed speed of said assumed engine, means for causing said gauge to register in accordance with the setting of said throttle control and in accordance with the setting of said governor control, means for causing said tachometer to register in accordance with the setting of said governor control, and additional means for actuating said gauge and said tachometer.

RUSSELL L. WEST.

REFERENCES CITED

The following references are of record in the file of this patent:

UNITED STATES PATENTS

| Number | Name | Date |
| --- | --- | --- |
| 1,393,456 | Ruggles | Oct. 11, 1921 |
| 1,797,794 | Rougerie | Mar. 24, 1931 |
| 1,825,462 | Link | Sept. 29, 1931 |
| 1,939,706 | Karnes | Dec. 19, 1933 |
| 2,099,857 | Link | Nov. 23, 1937 |
| 2,341,253 | West | Feb. 8, 1944 |

FOREIGN PATENTS

| Number | Country | Date |
| --- | --- | --- |
| 396,540 | Great Britain | 1933 |